(12) United States Patent
Walker et al.

(10) Patent No.: US 9,007,205 B2
(45) Date of Patent: Apr. 14, 2015

(54) EMBEDDED SECURITY SYSTEM FOR ENVIRONMENT-CONTROLLED TRANSPORTATION CONTAINERS AND METHOD FOR DETECTING A SECURITY RISK FOR ENVIRONMENT-CONTROLLED TRANSPORTATION CONTAINERS

(75) Inventors: Timothy Alan Walker, Plymouth, MN (US); Eduardo S. Tan, Chaska, MN (US); Ulrich Fink, Maple Grove, MN (US)

(73) Assignee: Thermo King Corporation, Minneapolis, MN (US)

( * ) Notice: Subject to any disclaimer, the term of this patent is extended or adjusted under 35 U.S.C. 154(b) by 913 days.

(21) Appl. No.: 13/150,982

(22) Filed: Jun. 1, 2011

(65) Prior Publication Data
US 2012/0306646 A1 Dec. 6, 2012

(51) Int. Cl.
*G08B 1/08* (2006.01)
*B60R 25/33* (2013.01)

(52) U.S. Cl.
CPC ...................................... *B60R 25/33* (2013.01)

(58) Field of Classification Search
CPC ....... G06Q 10/08; G06Q 10/06; G08B 25/10; G08B 25/14; G08G 1/20; B60R 25/102; B60R 25/33
USPC ................ 340/539.13, 426.1, 539.22, 568.1, 340/539.16, 545.6, 539.31; 701/213, 207
See application file for complete search history.

(56) References Cited

U.S. PATENT DOCUMENTS

| | | | |
|---|---|---|---|
| 5,424,720 A | 6/1995 | Kirkpatrick | |
| 5,918,183 A | 6/1999 | Janky et al. | |
| 6,292,724 B1 | 9/2001 | Apsell et al. | |
| 6,567,000 B2 | 5/2003 | Slifkin et al. | |
| 6,651,001 B2 | 11/2003 | Apsell | |
| 6,735,150 B2 | 5/2004 | Rothman | |
| 6,747,371 B2 | 6/2004 | Kotlow et al. | |
| 6,786,458 B1 | 9/2004 | Slifkin | |
| 6,795,783 B2 | 9/2004 | Kotlow et al. | |
| 6,863,222 B2 * | 3/2005 | Slifkin et al. | 236/51 |
| 6,879,962 B1 | 4/2005 | Smith et al. | |
| 6,927,736 B1 | 8/2005 | Kornbau et al. | |
| 6,957,133 B1 | 10/2005 | Hunt et al. | |

(Continued)

FOREIGN PATENT DOCUMENTS

CN 2690346 4/2005

OTHER PUBLICATIONS

John E. Habermann, "How Telematics Can Improve ROI?" Telematics Informational Presentation, dated Apr. 6, 2009 (4 pages).

(Continued)

*Primary Examiner* — Hoi Lau
(74) *Attorney, Agent, or Firm* — Hamre, Schumann, Mueller & Larson, P.C.

(57) ABSTRACT

An embedded security system for an environment-controlled trailer including a transportation refrigeration unit. The security system includes a plurality of sensors mounted to the trailer and a communication device embedded in the transportation refrigeration unit of the trailer, the communication device being configured to receive data from the plurality of sensors, and to send the received data to a controller being remote from the trailer. The controller is configured to monitor the security status of the trailer and to determine a security risk at the trailer based, at least in part, on the received data.

22 Claims, 5 Drawing Sheets

(56) References Cited

U.S. PATENT DOCUMENTS

| | | | |
|---|---|---|---|
| 7,702,327 B2 | 4/2010 | O'Toole et al. | |
| 7,812,733 B2 | 10/2010 | Perten et al. | |
| 7,911,330 B1 | 3/2011 | Perten et al. | |
| 2003/0097218 A1* | 5/2003 | Borugian | 701/213 |
| 2004/0008143 A1 | 1/2004 | Mikami et al. | |
| 2004/0104812 A1* | 6/2004 | Mayor | 340/425.5 |
| 2004/0178880 A1* | 9/2004 | Meyer et al. | 340/5.22 |
| 2004/0183673 A1* | 9/2004 | Nageli | 340/539.13 |
| 2005/0046567 A1* | 3/2005 | Mortenson et al. | 340/539.13 |
| 2005/0219042 A1* | 10/2005 | Thomson | 340/426.1 |
| 2005/0253703 A1 | 11/2005 | He et al. | |
| 2005/0253708 A1* | 11/2005 | Bohman et al. | 340/539.22 |
| 2006/0055603 A1 | 3/2006 | Jesson et al. | |
| 2006/0173586 A1 | 8/2006 | Swanson | |
| 2006/0187033 A1 | 8/2006 | Hall et al. | |
| 2006/0250235 A1* | 11/2006 | Astrin | 340/539.22 |
| 2006/0261944 A1* | 11/2006 | Ng et al. | 340/568.1 |
| 2006/0279424 A1* | 12/2006 | Yoong | 340/545.3 |
| 2007/0075075 A1 | 4/2007 | Jaeger et al. | |
| 2007/0149184 A1* | 6/2007 | Viegers et al. | 455/422.1 |
| 2007/0200687 A1 | 8/2007 | O'Toole | |
| 2007/0214258 A1 | 9/2007 | Karrapanan et al. | |
| 2008/0088441 A1 | 4/2008 | Breed | |
| 2008/0094209 A1* | 4/2008 | Braun | 340/539.13 |
| 2008/0117040 A1* | 5/2008 | Peel et al. | 340/539.16 |
| 2008/0125964 A1* | 5/2008 | Carani et al. | 701/207 |
| 2008/0228514 A1 | 9/2008 | Robinson et al. | |
| 2008/0252428 A1 | 10/2008 | Robinson et al. | |
| 2009/0015400 A1* | 1/2009 | Breed | 340/539.22 |
| 2009/0061897 A1 | 3/2009 | Hamilton et al. | |
| 2009/0201152 A1* | 8/2009 | Karr et al. | 340/545.6 |
| 2009/0228155 A1* | 9/2009 | Slifkin et al. | 700/299 |
| 2010/0033330 A1* | 2/2010 | Waterhouse et al. | 340/572.1 |
| 2010/0083689 A1 | 4/2010 | Robinson | |
| 2010/0257115 A1 | 10/2010 | Robinson et al. | |
| 2010/0321179 A1 | 12/2010 | O'Toole et al. | |
| 2011/0012731 A1* | 1/2011 | Stevens | 340/539.31 |
| 2011/0128143 A1* | 6/2011 | Daniel | 340/539.1 |
| 2011/0254690 A1 | 10/2011 | Perten et al. | |
| 2012/0306646 A1* | 12/2012 | Walker et al. | 340/539.16 |

OTHER PUBLICATIONS

PCT/US2012/037414 International Search Report and Written Opinion dated Nov. 26, 2012 (10 pages).

* cited by examiner

EMBEDDED SECURITY SYSTEM FOR ENVIRONMENT-CONTROLLED TRANSPORTATION CONTAINERS AND METHOD FOR DETECTING A SECURITY RISK FOR ENVIRONMENT-CONTROLLED TRANSPORTATION CONTAINERS

FIELD OF THE INVENTION

The invention relates to security systems for environment-controlled transportation containers. In particular, the invention relates to a security system for an environment-controlled container including an environment control unit, an embedded security system for an environment-controlled trailer including a transportation refrigeration unit, and a method for detecting a security risk at an environment-controlled trailer including a transportation refrigeration unit.

BACKGROUND

Environment-controlled transportation containers, such as refrigerated trailers, refrigerated containers, and other environment-controlled trucks, are used for transporting goods that are to be kept in an environment range to prevent spoiling (e.g., below or above a certain temperature). Sometimes, the refrigerated transported cargo has a very high value measured in tens, and sometime in hundreds of thousands of dollars (e.g., pharmaceutical products). Generally, the logistics companies assume the risk of theft of the cargo when these companies are hired to transport the cargo. Therefore, the logistics companies must monitor the security status of the container and communicate the status to a remote location along with other information, such as the location of the container and the status of the environmental conditions of the container.

SUMMARY

Although there are exiting security systems for environment-controlled transportation containers, these systems have various deficiencies. For example, the electrical power to the telecommunications modem (telematics), which transfers an alarm signal to a central location, is generally supplied by an environment control unit (e.g., a transportation refrigeration unit or TRU) of the transportation container. Further, the telematics antenna of the exiting security systems is typically in plain sight and is mounted on top of the TRU. Thieves know that the environment-controlled transportation containers are monitored by security systems. Feedback provided by logistics operators is that the thieves disconnect the TRU battery or disconnect the telematics antenna in order to disable system monitoring and telematics communication. Consequently, theft protection monitoring is lost once either one or both the battery or the antenna are disabled. Thus, there is a need for an improved security monitoring system for environment-controlled transportation containers that can provide and maintain telematics remote monitoring for security protection.

In one embodiment, the invention provides an embedded security system for an environment-controlled trailer including a transportation refrigeration unit. The security system includes a plurality of sensors mounted to the trailer and a communication device embedded in the transportation refrigeration unit of the trailer, the communication device being configured to receive data from the plurality of sensors, and to send the received data to a controller being remote from the trailer. The controller is configured to monitor the security status of the trailer and to determine a security risk at the trailer based, at least in part, on the received data.

In another embodiment the invention provides a method for detecting a security risk at an environment-controlled trailer including a transportation refrigeration unit and a communication device removably coupled to a controller of the transportation refrigeration unit. The method includes obtaining sensor data from a plurality of sensors mounted to the trailer and a current location of the trailer from a global positioning system (GPS), receiving communication, including the sensor data and the current trailer location, from the plurality of sensors and from the GPS, sending the sensor data and the current trailer location to a controller that is remote from the trailer, and receiving a response from the controller, the response indicative of a security risk at the trailer.

In yet another embodiment the invention provides a security system for an environment-controlled container including an environment control unit. The security system includes a plurality of sensors mounted to the container and a communication device removably connected to a controller of the environment control unit, the communication device configured to receive sensor data from the plurality of sensors. The system also includes a global positioning system embedded in the communication device and configured to provide a current location of the container to the communication device and a logistics operations center controller that is in electronic communication with the communication device and is configured to receive sensor data and the current location of the container from the communication device. The system further includes a computer readable memory storing instructions that, when executed by the logistics operations center controller, cause the logistics operations center controller to monitor the received sensor data and the location of the container and to determine a security risk at the container based, at least in part, on the received data and trailer location.

Other aspects of the invention will become apparent by consideration of the detailed description and accompanying drawings.

DETAILED DESCRIPTION

Figure 1:
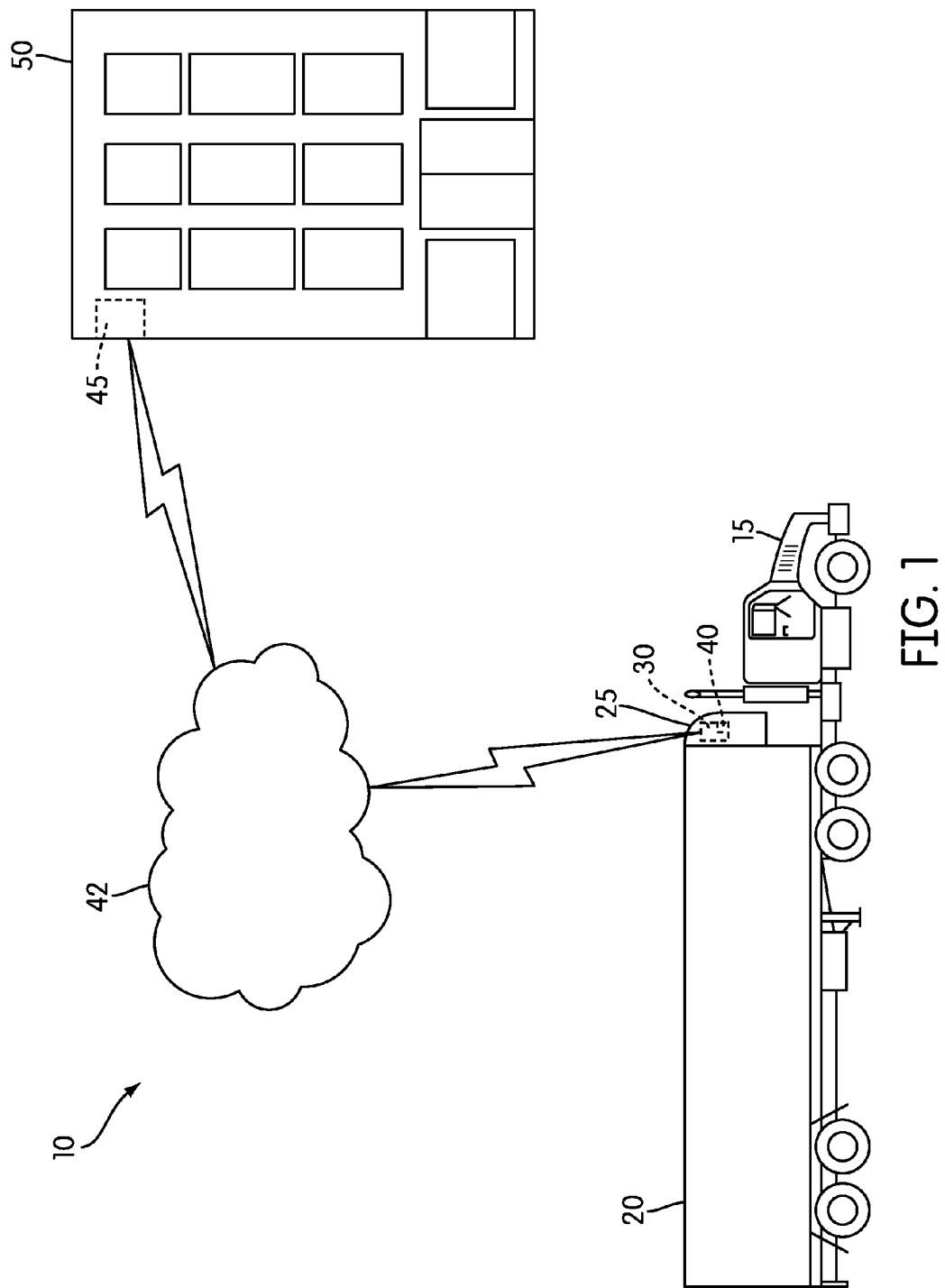
FIG. 1 is a schematic illustration of an embedded security system for an environment-controlled transportation container.

Before any construction of the invention are explained in detail, it is to be understood that the invention is not limited in its application to the details of construction and the arrangement of components set forth in the following description or illustrated in the following drawings. The invention is capable of other embodiment and of being practiced or of being carried out in various ways.

As should also be apparent to one of ordinary skill in the art, the systems shown in the figures are models of what actual systems might be like. Many of the modules and logical structures described are capable of being implemented in software executed by a microprocessor or a similar device or being implemented in hardware using a variety of components. As described in subsequent paragraphs, the specific configurations illustrated in the drawings are intended to exemplify embodiments of the invention and other alternative configurations are possible. A plurality of different structural components may be utilized to implement the invention. Furthermore, throughout the specification capitalized terms are used. Such terms are used to conform to common practices and to help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

FIG. 1 shows one construction of an embedded security system 10 for an environment-controlled container (e.g., a refrigerated trailer). A semi-trailer truck 15 with a refrigerated trailer 20 having a transportation refrigeration unit ("TRU") 25 is monitored by the security system 10. A communication device 30, that is embedded in the TRU 25, receives data from a plurality of sensors 35. The communication device 30 also receives the current location of the trailer 20 from a global positioning system 40 ("GPS") that is embedded in the communication device 30. The communication device 30 sends the received sensor data and current location of the trailer via wide area communication network 42 to a controller 45 at a remote logistics operations center 50. The controller 45 monitors the security status of the trailer 20 and determines a security risk at the trailer based, at least in part, on the received data and the current trailer location.

Generally, the TRU 25 regulates the temperature of the trailer 20 and can have different sizes and shapes. In most cases, the TRU 25 is mounted on the top front portion of the trailer 20, approximately above and/or behind the cabin of the semi-trailer truck 15 (depending on the type of the truck). The TRU 25 includes a controller 55 embedded inside a TRU control box 60 (not shown). Generally, the trailer 20 and the TRU are monitored and controlled by a remote control system (not shown) located at the logistics operations center. The remote control system receives data from the refrigerated trailer 20 either by polling the trailer 20 or by scheduled periodic communication.

The data that the remote control system receives from the refrigerated trailer 20 includes, but is not limited to, the trailer's present position, a speed of the trailer, a temperature set point in the trailer, a return air temperature, a discharge air temperature, an operating mode, a unit mode, an alarm status, an hours of operation indication, a fuel quantity, a fuel consumption rate and total, a status of a door, a battery voltage, and other sensed information. In response, the remote control system can communicate with and/or send commands back to the trailer 20.

It is to be understood that the security system 10 of the refrigerated trailer 20 illustrated in FIG. 1 represents only one exemplary construction, and thus other constructions are possible. Therefore, the security system 10 can be implemented in other environment-controlled containers. In one example, the security system 10 can be used in containers or vehicles that require the temperature of the container to be kept above a specific threshold (e.g., floral containers, etc.). In other constructions, the security system 10 can be used to regulate other environmental characteristics of the container (e.g., humidity, air pressure, light). Further, depending on the type of the environment-controlled container, the communication device 30 can be removably coupled to other types of environment control units.

Figure 2:
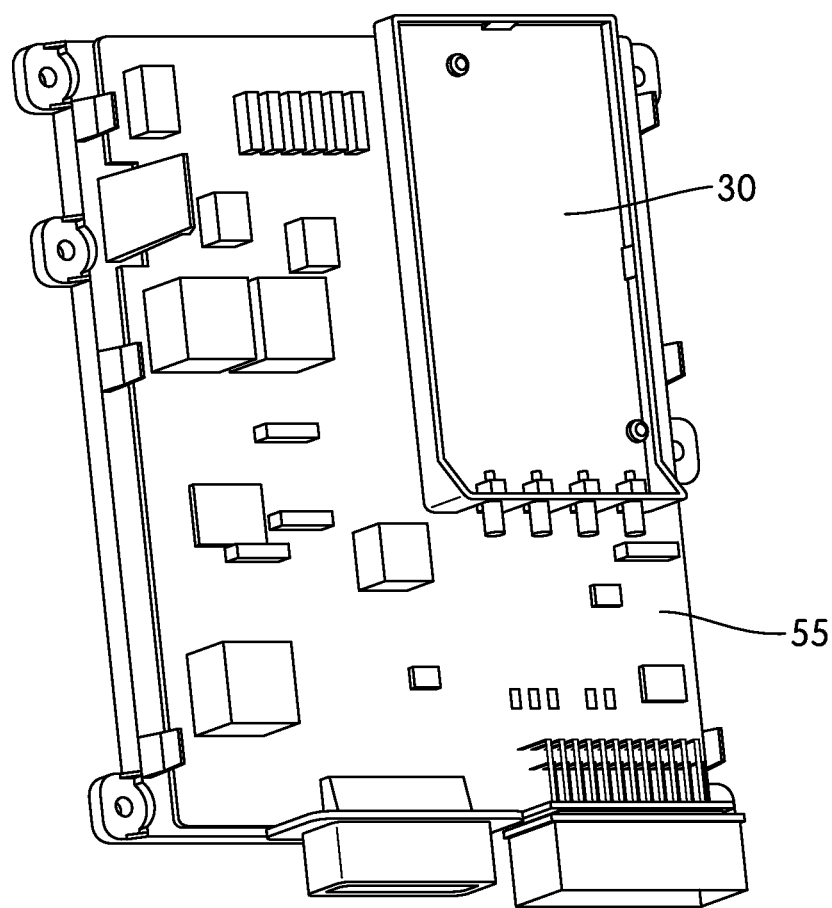
FIG. 2 is an illustration of a communication device of the embedded security system of FIG. 1 mounted to a controller of the container of FIG. 1.

The existing trailer remote control system is not always sufficient to protect the cargo of the refrigerated trailer 20 from theft. For that reason, the embedded security system 10 is used in addition to or in the alternative of the remote control system. As shown in FIG. 2, in order to protect the security system 10, the communication device 30 of the security system 10 is embedded inside the control box 60 of the TRU 25 and is removably connected (i.e., mounted) to the TRU controller 55. For example, the communication device 30 comprises an extra printed circuit board that is attached to the top of the main printed circuit board of the TRU controller 55.

Figure 3:
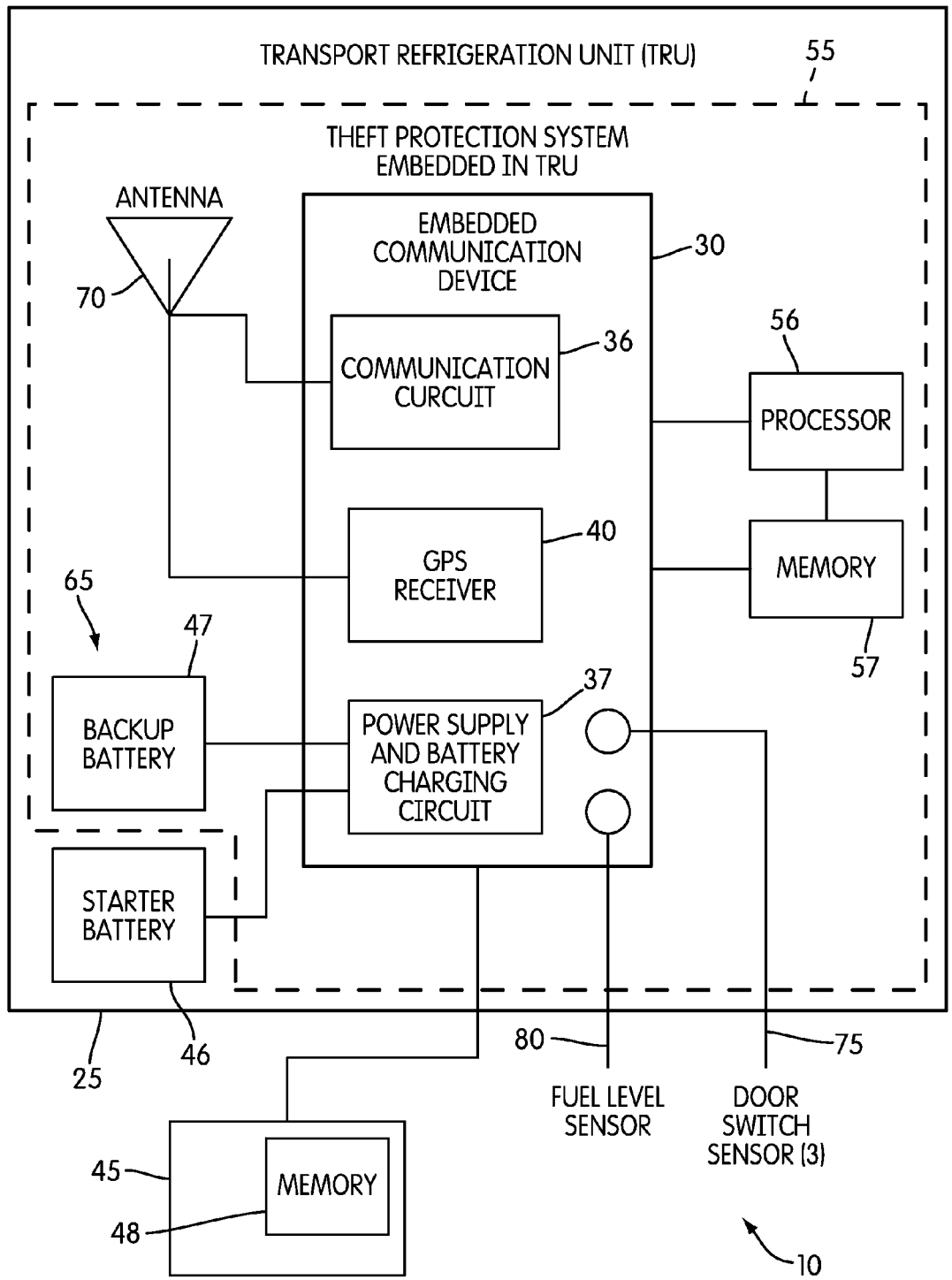
FIG. 3 is a block diagram of the embedded security system of FIG. 1.

As shown in FIG. 3, the TRU controller 55 further includes a processor 56 (e.g., a microprocessor, microcontroller, ASIC, DSP, etc.) and memory 57 (e.g., flash, ROM, RAM, EEPROM, etc.), which can be internal to the processor 56, external to the processor 56, or a combination thereof. The TRU controller 55 controls the operation of the communication device 30. In alternative constructions, the communication device 30 can include a separate processor and/or memory (not shown) that processes the sensor data, determines a security risk associated with the trailer, and notifies the logistic operations center. In some constructions, the communication device 30 is held in place by one or more fasteners (e.g., screws). Other methods for securing the communication device 30 in place are also contemplated. When installed, the communication device 30 is held in place such that it will not separate from the controller 55 of the TRU 25 when the trailer 20 is moving. In alternative constructions, the communication device 30 can include a separate microprocessor and/or memory that are independent from the TRU controller 55.

FIG. 3 illustrates a block diagram of a construction of the embedded security system 10 for a refrigerated trailer. The security system 10 includes the communication device 30 that is embedded in the TRU controller 55, a plurality of sensors 35 mounted to the trailer, a power supply 65 powering the communication device 30, and an antenna 70. The communication device 30 is in electronic communication with the controller 45 located at the remote logistics operations center 50. The controller 45 includes a computer readable memory 48 that stores instructions for the controller 45. When executed by the controller 45, the instructions cause the controller to determine a security risk at the trailer 20.

The communication device 30 of the embedded security system 10 is directly connected to the plurality of sensors 35. In the conventional security systems for refrigerated containers, the sensors 35 are connected to the TRU controller 55. Thus, when thieves disable the TRU (e.g., by disconnecting the TRU battery) they interrupt the communication between the sensors 35 and the standard trailer security system. By directly connecting the sensors 35 to the communication device 30, the embedded security system 10 avoids this problem and ensures that the sensor data will be sent to the communication device 30 and, consequently, to the controller 45. In some constructions, the sensors 35 can include door switch sensors 75 and at least one fuel level sensor 80. The door switch sensors 75 are positioned at the back swinging doors of the trailer 20. In addition, door switch sensors 75 are positioned at the side doors of the trailer 20 (i.e., when the trailer is a multizone trailer that includes several areas with different temperate levels). The door switch sensors 75 monitor the status of the trailer doors (e.g., whether the doors are opened or closed) and transmit data related to the status of the doors to the communication device 30. The fuel level sensor 80 monitors the level of fuel supply to the TRU 25 and transmits data related to the TRU fuel supply level to the communication device 30. In alternative constructions, the embedded security system 10 can include different type of sensors that transfer other types of data to the communication device 30.

The communication device 30 also includes the GPS 40 that is embedded in the communication device 30 (e.g., the GPS is a chip on board attached to the communication device). The GPS 40 determines the current location of the trailer 20. Further, the communication device 30 includes a communication circuit 36 (e.g., cellular radio) that provides the communication device 30 with communication capabilities. In particular, the communication circuit 36 is configured to send various data (e.g., sensor data received from the sensors 35 and the current location of the trailer 20) to the controller 45. The communication circuit 36 sends the sensor data and the current trailer location to the controller by using the wide area communication network 42. In some constructions, the wide area communication network 42 can include cellular, satellite, WiFi, wireless personal area network (WPAN), radio frequency, or other types of communication network. Thus, the communication circuit 36 and the controller 45 can communicate via a cellular link, a satellite link, a WiFi link (e.g., via a router), a WPAN link (e.g., to a personal data assistant), a radio frequency (RF) link, and other suitable communications links.

As shown in FIG. 3, the GPS 40 and the communication circuit 36 are connected to at least one antenna 70 that is embedded in the TRU control box 60. The antenna 70 of the embedded security system 10 is out of sight and can not be viewed from outside the trailer 20. The antenna of the conventional remote monitoring systems is generally positioned on the top of the TRU box 60 or in another area where is in plain sight from outside the trailer. When thieves brake or disconnect the antenna, they ultimately disable the conventional trailer monitoring system. Therefore, the embedded security system 10 includes the antenna 70 that is hidden inside the TRU box 60 and, therefore, can not be easily disabled. In alternative constructions, the communication circuit 36 of the embedded security system 10 can also be connected to the antenna positioned on the outside of the TRU 25.

The communication device 30 further includes a power supply circuit 37. The power supply circuit 37 controls the power supplied to the communication device. In the conventional remote monitoring systems for refrigerate trailers, power to the telecommunications modem (i.e., the telematics that communicates with the operations center) is generally supplied by the TRU 25 starter battery. In the embedded security system 10, the communication device 30 is powered by the starter battery 46 of the TRU. In addition, the communication device 30 is powered by a backup battery 47 embedded in the control box 60 of the TRU. Therefore, even if the starter battery 46 of the TRU is removed or disconnected, the communication device 30 and the security system 10 can still operate and detect a security risk at the trailer 20.

For that reason, the power supply circuit 37 of the communication device 30 is configured to automatically switch to the backup battery 47 when the starter battery 46 is removed or disconnected. When the starter battery 46 is reconnected to the TRU 25 and to the communication device 30, the power supply circuit 37 of the communication device 30 is configured to automatically switch to the starter battery 46. Further, the power supply circuit 37 of the communication device 30 is also configured to recharge the backup battery 47 when reconnected to the starter battery 46.

Figure 4:
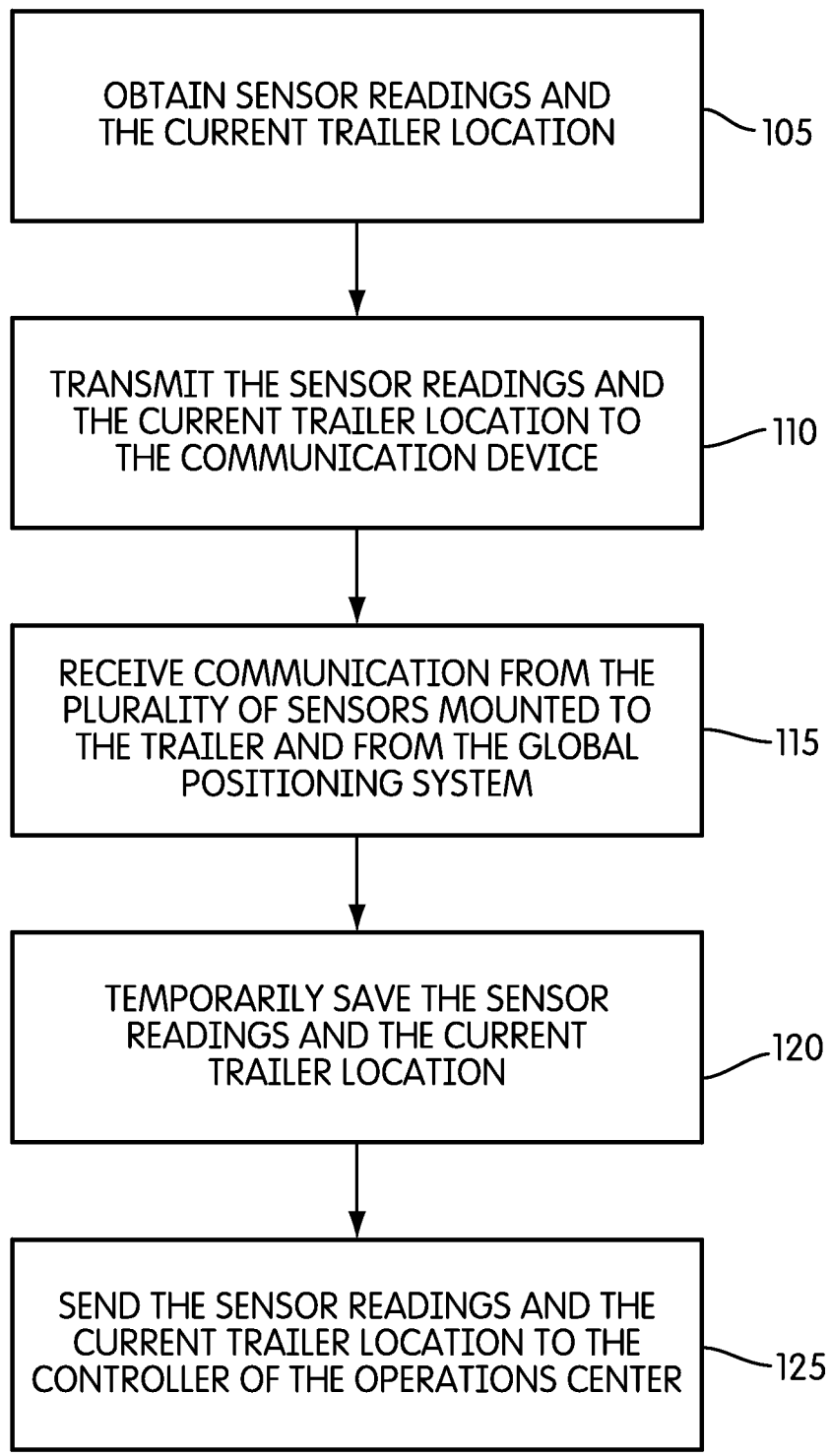
FIG. 4 is a flow diagram of an installation and operation of the communication device of FIG. 2 for communicating to a remote operations center.

FIG. 4 illustrates a method that shows the operation of the communication device 30 of the security system 10 for communicating to the controller 45 of the remote operations center 50. Initially, the plurality of sensors 35 mounted on the trailer 20 obtain various sensor readings and the GPS 40 embedded in the communication device 30 obtains the current location of the trailer 20 (step 105). Next, the sensors 35 and the GPS 40 transmit the sensor readings and the current trailer location to the communications device 30 (step 110). The communication device 30 receives the communication from the plurality of sensors 35 and from the GPS 40 (step 115). For example, the communication device receives information regarding the status of the trailer doors from the door switch sensors 75 and information about the level of the fuel supply to the TRU 25 from the fuel level sensor 80. The communication device 30 can temporarily save the received sensor data and the current sensor location to the memory 57 of the TRU controller 55 (step 120). Next, by using the communication circuit 36 and the antenna 70, the communication device sends the sensor data and the current sensor location to the controller 45 of the remote operations center 50 (step 125).

Figure 5:
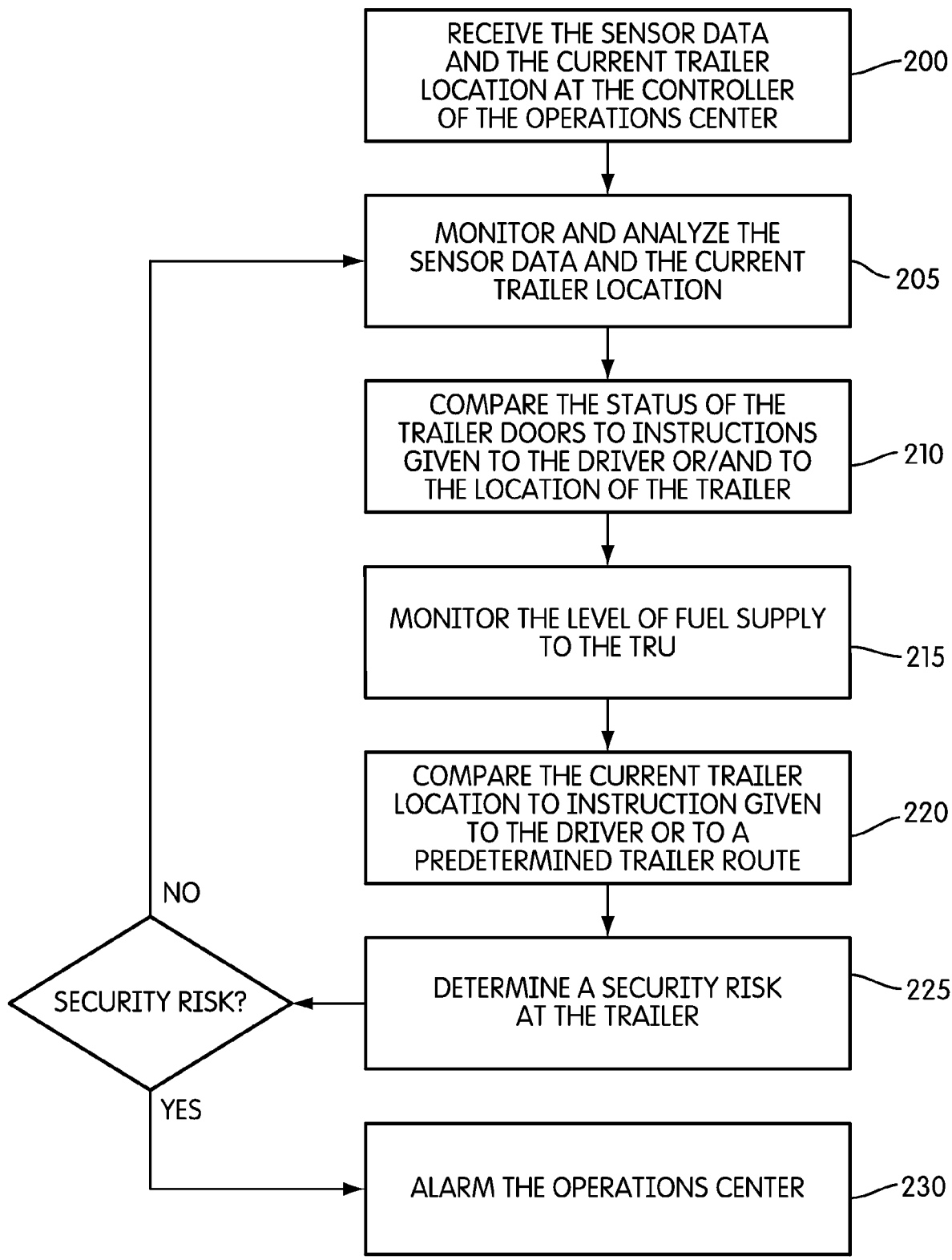
FIG. 5 is a flow diagram of an operation of an exemplary remote operations center of the embedded security system of FIG. 1.

FIG. 5 illustrates a method that shows the operation of the controller 45 of the remote operations center 50 in the embedded security system 10. The controller 45 receives the sensor data and the current location of the trailer from the communication device 30 (step 200). For example, the controller 45 receives data regarding the status of the trailer doors from the door switch sensors 75 and information about the level of the fuel supply to the TRU 25 from the fuel level sensor 80. The controller 45 then monitors and analyzes the received data and the current location of the trailer 20 (step 205). In particular, the controller 45 compares the status of the trailer doors (e.g., opened or closed) to instructions given to the driver and to the location of the trailer (step 210). Further, the controller 45 monitors the level of fuel supply to the TRU 25 (step 215). Also, the controller 45 compares the received current trailer location to instructions given to the driver or to a premeditated trailer route (step 220). Therefore, the controller 45 determines a security risk at the trailer 20 based, at least in part, on the received sensor data and the current location of the trailer 20 (step 225). The controller alarms the logistics operations center (step 230) if the entire trailer 20 is stolen, or if the door of the trailer is opened, or if the fuel supply for the trailer's TRU is stolen. Further, the controller 45 returns to analyzing the received data and the current location of the trailer 20 (step 205) when the controller determines that there is no security risk at the trailer.

Thus, the invention provides, among other things, a new and useful embedded security system for refrigerated containers. Various features and advantages of the invention are set forth in the following claims.

What is claimed is:

1. An embedded security system for an environment-controlled trailer including a transportation refrigeration unit, the security system comprising:
    a plurality of sensors mounted to the trailer; and
    a communication device embedded in the transportation refrigeration unit of the trailer, the communication device being configured to receive data from the plurality of sensors, and to send the received data to a controller being remote from the trailer,
    wherein the controller is configured to monitor the security status of the trailer and to determine a security risk at the trailer based, at least in part, on the received data,
    wherein the sensors include door switch sensors that monitor the status of the trailer doors, and wherein the controller is configured to compare the status of the trailer doors to instructions given to the driver or the location of the trailer.

2. The system of claim 1, wherein the controller is positioned at a remote logistics operations center.

3. The system of claim 1, wherein the communication device further comprises a global positioning system (GPS) embedded in the communication device.

4. The system of claim 3, wherein the GPS determines a current location of the trailer and the communication device electronically communicates the current location of the trailer to the controller.

5. The system of claim 1, wherein the communication device is configured to send a current location of the trailer to the controller, and
wherein the controller is configured to determine a security risk at the trailer based, at least in part, on the received current location of the trailer.

6. The system of claim 4, wherein the communication device further comprises a communication circuit configured to send the received sensor data and trailer location to the controller.

7. The system of claim 1, further comprising at least one antenna embedded in the transportation refrigeration unit.

8. The system of claim 1, wherein the communication device further comprises a power supply circuit configured to control the power supplied to the communication device.

9. The system of claim 1, wherein the communication device is powered by a starter battery of the transportation refrigeration unit and a backup battery embedded in the transportation refrigeration unit.

10. The system of claim 9, wherein the communication device is configured to automatically switch to the backup battery when the starter battery is removed or disconnected.

11. The system of claim 1, wherein the sensors include at least one fuel level sensor that monitors the level of fuel supply to the transportation refrigeration unit.

12. The system of claim 1, wherein the communication device is embedded inside a control box of the transportation refrigeration unit and is mounted to a controller of the transportation refrigeration unit.

13. The system of claim 1, wherein the communication device comprises a printed circuit board attached to a main printed circuit board of the controller of the transportation refrigeration unit.

14. The system of claim 6, wherein the communication circuit utilizes at least one of cellular, satellite, WiFi, wireless personal area network, and radio frequency communication networks.

15. A method for detecting a security risk at an environment-controlled trailer including a transportation refrigeration unit and a communication device removably coupled to a controller of the transportation refrigeration unit, the method comprising:
obtaining sensor data from a plurality of sensors mounted to the trailer and a current location of the trailer from a global positioning system (GPS);
receiving communication, including the sensor data and the current trailer location, from the plurality of sensors and from the GPS;
sending the sensor data and the current trailer location to a controller that is remote from the trailer;
monitoring, via the controller that is remote from the trailer, the received sensor data and current trailer location;
determining, via the controller that is remote from the trailer, a security risk at the trailer based, at least in part, on the received sensor data and current trailer location; and
receiving a response from the controller that is remote from the trailer, the response indicative of the security risk at the trailer,
wherein monitoring the received sensor data further includes comparing the status of the trailer doors to instructions given to the driver and to the location of the trailer.

16. The method according to claim 15, further comprising powering the communication device by a starter battery of the transportation refrigeration unit and by a backup battery embedded in the transportation refrigeration unit.

17. The method according to claim 16, further comprising automatically switching the communication device to the backup battery when the starter battery is removed or disconnected.

18. The method according to claim 15, wherein monitoring the received sensor data further includes monitoring a level of fuel supply to the transportation refrigeration unit.

19. A method for detecting a security risk at an environment-controlled trailer including a transportation refrigeration unit and a communication device removably coupled to a controller of the transportation refrigeration unit, the method comprising:
obtaining sensor data from a plurality of sensors mounted to the trailer and a current location of the trailer from a global positioning system (GPS);
receiving communication, including the sensor data and the current trailer location, from the plurality of sensors and from the GPS;
sending the sensor data and the current trailer location to a controller that is remote from the trailer;
monitoring, via the controller that is remote from the trailer, the received sensor data and current trailer location;
determining, via the controller that is remote from the trailer, a security risk at the trailer based, at least in part, on the received sensor data and current trailer location; and receiving a response from the controller that is remote from the trailer, the response indicative of the security risk at the trailer,
wherein monitoring the current location of the trailer further includes comparing the current trailer location to instructions given to the driver or to a premeditated trailer route.

20. A security system for an environment-controlled container including an environment control unit, the security system comprising:
a plurality of sensors mounted to the container;
a communication device removably connected to a controller of the environment control unit, the communication device configured to receive sensor data from the plurality of sensors;
a global positioning system embedded in he communication device and configured to provide a current location of the container to the communication device;
a logistics operations center controller that is in electronic communication with the communication device and is configured to receive sensor data and the current location of the container from the communication device; and
a computer readable memory storing instructions that, when executed by the logistics operations center controller, cause the logistics operations center controller to monitor the received sensor data and the location of the container, and determine a security risk at the container based, at least in part, on the received data and container location, wherein the plurality of sensors include one or more door switch sensors that monitor the status of one or more container doors of the container, and wherein the controller is configured to compare the status of the one or more container doors to instructions given to the driver or the location of the container.

21. The system of claim 1, wherein the plurality of sensors include at least one of a door switch sensor configured to monitor an open or closed status of a trailer door, a fuel level sensor configured to monitor a level of fuel supply to the transport refrigeration unit, wherein the received data from the plurality of sensors includes at least one of a status of the trader door and a level of the fuel supply to the transport refrigeration unit, and wherein the controller is configured to monitor the security status of the trailer and to determine the security risk at the trader based, at least in part, on at least one of the status of the trailer door and the level of the fuel supply to the transport refrigeration unit.

22. An embedded security system for an environment-controlled trailer including a transportation unit, the security system comprising:

a plurality of sensors mounted to the trailer; and a communication device embedded in the transportation refrigeration unit of the trailer, the communication device being configured to receive data from the plurality of sensors, and to send the received data to a controller being remote from the trailer, wherein the controller is configured to monitor the security status of the trailer and to determine a security risk at the trailer based, at least in part, on the received data, and wherein the controller is configured to determine e security risk at the trailer based, at least in part, on a comparison between the current location of the trailer and an instruction given to the driver or a premeditated trailer route.

* * * * *